Feb. 26, 1935. J. P. GERBER 1,992,206
WIRE COATING APPARATUS
Filed Nov. 12, 1928 5 Sheets-Sheet 4
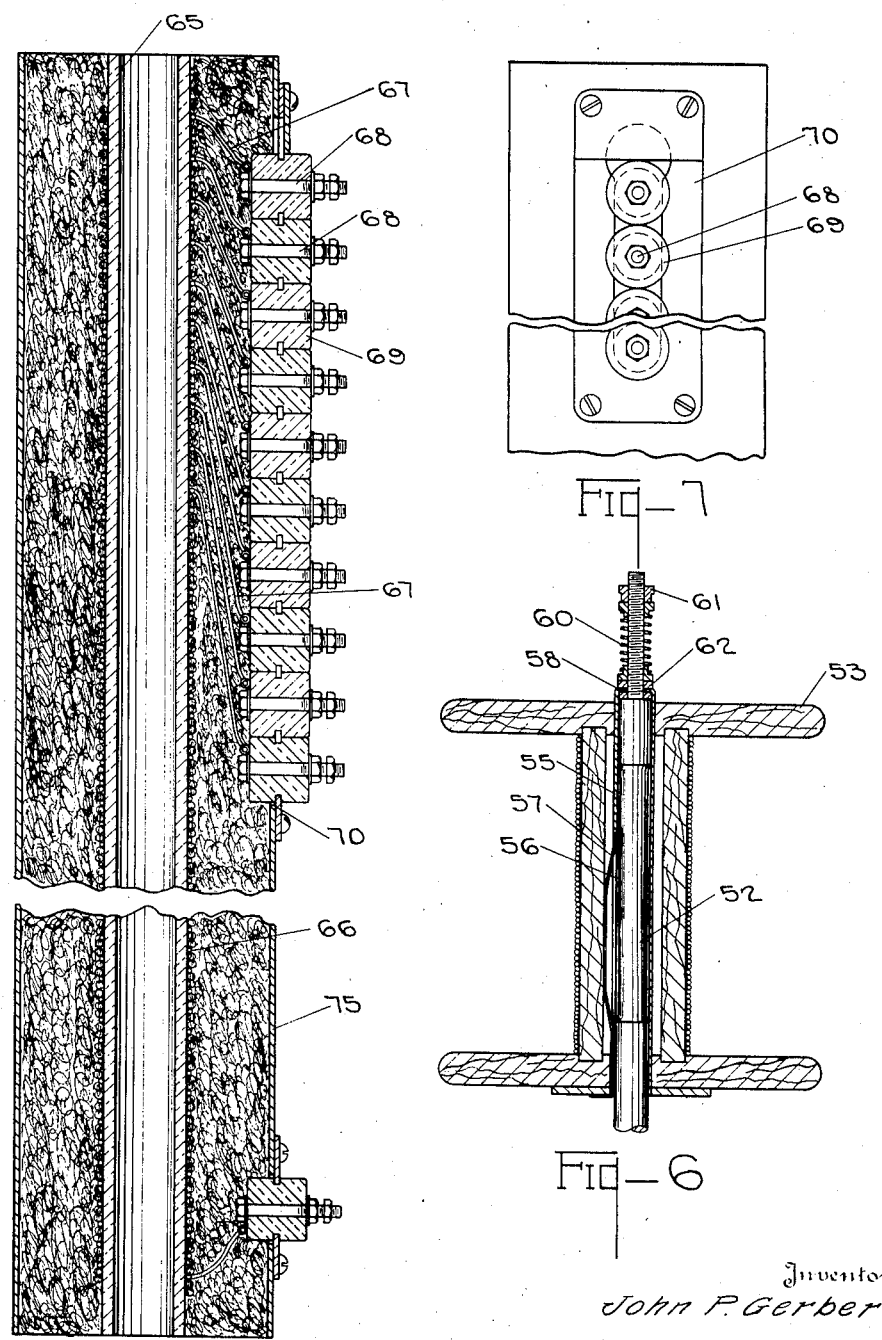

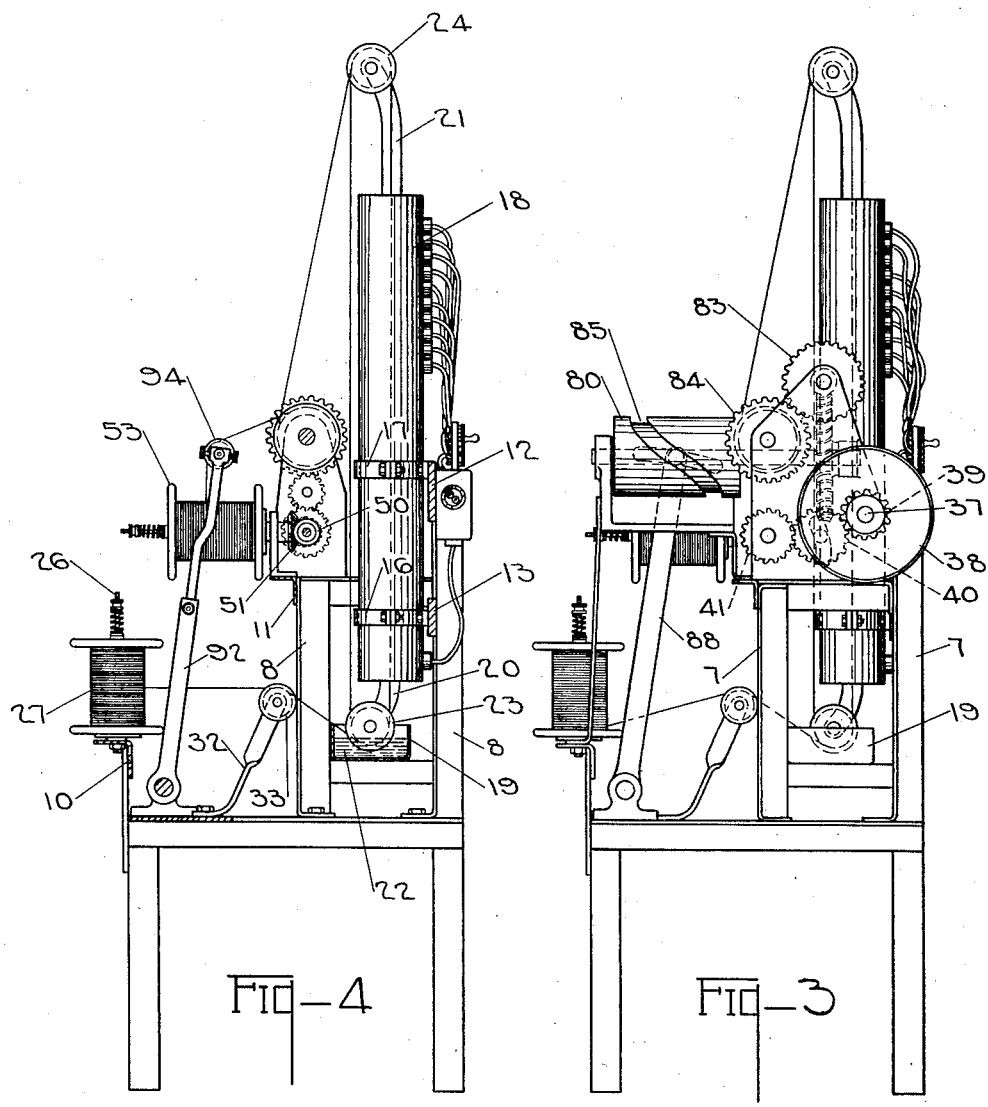

Feb. 26, 1935.   J. P. GERBER   1,992,206
WIRE COATING APPARATUS
Filed Nov. 12, 1928   5 Sheets-Sheet 5

Inventor
John P. Gerber

By Braselton, Whitcomb & Davis
Attorneys.

Patented Feb. 26, 1935

1,992,206

UNITED STATES PATENT OFFICE 1,992,206

WIRE COATING APPARATUS

John P. Gerber, Muskegon, Mich., assignor to The Electric Auto-Lite Company, Toledo, Ohio, a corporation of Ohio Application November 12, 1928, Serial No. 318,920

5 Claims. (Cl. 219—36)

This invention relates to a method and machine for applying and heat treating a coat of protective material and more particularly to a machine for applying and baking enamel upon wire.

An object of my invention is to provide a machine for rapidly applying one or more coats of enamel to wire and subjecting the coated wire to a proper heat to harden the enamel and for finally removing the coated wire from the heating element and conveying the same to a collecting spool.

Another object is the provision of a machine of this character in which all the operations are automatically performed and in which the heating elements are energized by electricity.

Another object is the provision of simple and reliable means for controlling the temperature of the heating elements or baking ovens so that varying degrees of heat may be had rendering the device suitable for use with various sizes of wire and kinds of enamel.

Another object is the provision of means for applying one or more coats of enamel successively to a continuous strand of wire and for applying heat to the enamel after each successive coating.

A further object is the provision of means for moving the wire through the enamel and the baking ovens at a uniform rate of speed.

Still a further object is the provision of a compact enameling and baking unit of high heating efficiency and capable of withstanding comparatively high temperatures, the unit being so constructed as to render it particularly adaptable for use in batteries thus making it possible to obtain a high rate of production of enameled wire from a machine occupying a comparatively small space.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred, in which Figure 1 is a front elevation of the machine of my invention showing a plurality of wire enameling units;

Figure 3 is a right hand end elevational view of the machine shown in Figure 1;

Figure 4 is a left hand elevational view of the machine;

Figure 5 is an enlarged vertical sectional view through one of the electrically heated baking ovens forming a part of my invention;

Figure 6 is an enlarged vertical sectional view showing the method of supporting one of the wire collecting spools;

Figure 7 is an enlarged fragmentary detail view showing a part of one of the heating elements;

Figure 1:
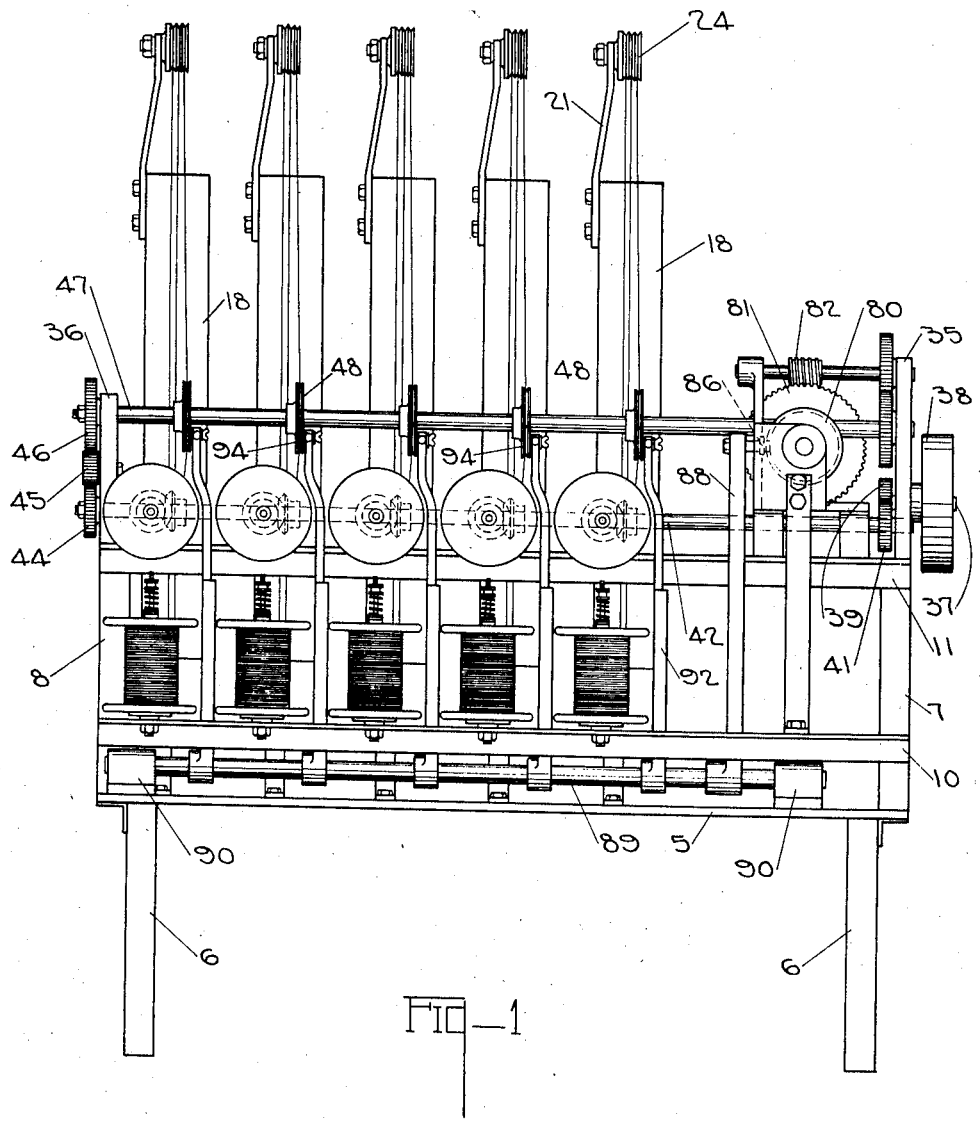
Figure 2:
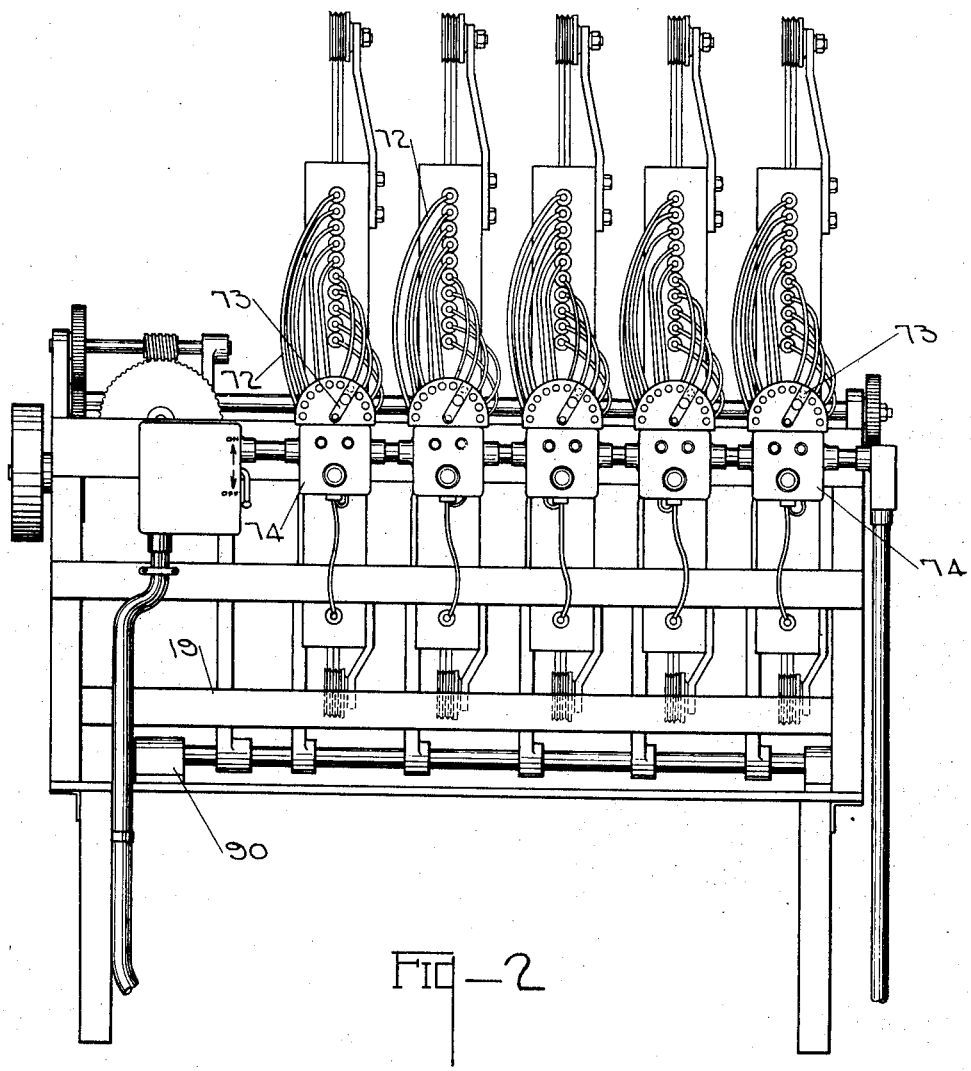
Figure 2 is a rear elevational view of the parts shown in Figure 1.

According to the invention, the wire to be enameled is slowly passed around a pulley immersed in a receptacle containing a liquid enamel where it receives a uniform coat and immediately passes up into an oven heated to the proper degree for the baking or hardening of the enamel. By the time the coated wire reaches the top of the oven where it emerges, the coat of enamel is completely hardened and the wire is then passed over a pulley and down into the enamel for a second coat, or if a single coat only is desired, the coated wire may be wound directly upon a collector spool.

I have shown the machine of my invention as used for coating comparatively fine wire with enamel, but it is to be understood that I contemplate the use of my device for coating other objects wherever its use may be found applicable. The machine comprises substantially a skeleton frame 5 supported upon legs 6, each end of the frame 5 having an upwardly projecting portion 7 and 8. The end portions 7 and 8 are connected by means of angle members 10 and 11 and flat strips 12 and 13.

Secured to the flat strips 12 and 13 by means of suitable strips 16 and 17 is a plurality of electrically heated tubes or ovens 18 which will hereinafter be described in detail and which provide a means for baking the enamel on the wire. Positioned longitudinally of the frame and immediately beneath the lower extremities of the tubes 18 is an elongated receptacle 19 adapted to contain the liquid enamel 22. Secured to the extremities of each tube 18 are strips 20 and 21 carrying grooved pulleys or wheels 23 and 24.

The pulleys 23 and 24 are provided with one or more peripheral grooves depending upon the number of coats of enamel that the wire is to receive. The pulleys 23 project into the enamel receptacle 19 and are partially immersed in the liquid enamel 22 so that the wire in passing around the pulley is also immersed in the enamel, the coated wire subsequently passing up through the baking tubes 18.

Supported upon the horizontal portion of the angle member 10 is a plurality of arbors or mandrels 26 which are adapted to support spools of bare wire 27 forming the source of wire supply for the machine.

I have provided guiding means for the wire which comprises a plurality of brackets 32 secured to the frame 5 and carrying at their extremities pulleys 33, the wire being adapted to be passed over the pulleys 33 as it is taken from the spools 27 and thence around the pulleys 23 and immersed in the enamel bath.

I have provided means for feeding the wire at a substantially uniform rate and for collecting the wire upon a collecting spool which means will now be described. Secured to the upright members 7 and 8 are plates 35 and 36 which form journals for a plurality of shafts. One of the shafts 37 journalled in the plate 35 carries a driving pulley 38 adapted to be connected by means of a belt (not shown) to a suitable source of power, the inner end of the shaft 37 being provided with a gear 39 meshing with an idling gear 40, the latter in turn being in mesh with a gear 41 fixed to a horizontally extending shaft 42. The left hand end of the shaft 42 is connected by means of a train of gears 44, 45 and 46 to another horizontally extending shaft 47, the latter being provided with a plurality of grooved wire drawing or feeding pulleys 48, a pulley 48 being positioned in front of each baking tube 18.

The shaft 42 is provided with a plurality of miter gears 50 meshing with similar gears 51, the gears 51 being fixed upon laterally projecting mandrels 52 carrying the wire collecting spools 53.

The wire collecting spools 53 are so mounted upon the mandrels 52 that a substantially constant coefficient of friction exists between the driving mandrel 52 and the spool 53. It is obvious that means must be provided for slippage to occur or take place between the spools 53 and the mandrels 52 in order to compensate for the varying diameters of the spools of wire as the wire is wound thereon in view of the fact that the wire is moved at a uniform rate of speed as the wire drawing pulleys 48 are driven at a constant speed. To this end each mandrel 52 is provided with a sleeve 55 which is grooved as at 56 to accommodate a flat spring 57, the spring 57 normally exerting an outward force thus creating substantial friction between the periphery of the sleeve 55 and the inner bore of the spool 53. One end of the sleeve 55 is provided with an inwardly turned flange 58 which is adapted to be engaged on either side by friction discs 59 and 62, the latter being urged into engagement with the flange 58 by means of a spring 60, the tension on the spring 60 being rendered adjustable by means of a thumb nut 61. From the foregoing it will be apparent that the sleeve 55 and the spool 53 are driven by means of the frictional force existing between the flange 58 and the discs 59 and 62, the amount of friction for driving the parts being varied by means of a thumb screw 61.

Each electric oven comprises a tube 65 of earthenware or other refractory material capable of withstanding a high degree of heat. Wound upon the exterior of the tube is a plurality of turns of wire 66 forming the heating element certain of the turns of wire being tapped as at 67, the leads from these taps being connected to terminals 68 each terminal passing through an insulating bushing 69. The insulating bushings are assembled in a plate 70 as particularly shown in Figures 5 and 7, the terminals 68 being connected by means of leads 72 to the points of selector switches 73. The plate 70 carrying the terminals 68 and bushing 69 is secured to a metallic tube 75 surrounding the tube 65 and heating element 66. The space between tube 65 and wire 66 and the cylindrical tube 78 is preferably filled or packed with a heat resisting material as, for example, pulverized asbestos so that very little heat is lost through radiation through the walls of the tube. In order to retain the coils of the heating element in place and prevent any possibility of electric contact between the adjacent coils, the coils are preferably separated from each other by means of an insulating heat resisting material 79 such as, for example, asbestos rope.

By employing a construction of the type just described, the heat generated in the element 66 is substantially confined within the earthenware tube 65 through which the enameled wire is adapted to pass during the heat treating operation.

In order that the wire on the collecting spool be evenly distributed throughout the length thereof I have provided a cam drum 80 which is driven by means of a worm wheel 81, worm 82 and spur gears 83 and 84, the gear 84 being secured to and rotatable with the horizontal shaft 47. The cam drum 80 is provided with a peripheral groove 85 which is adapted to accommodate a roller or cam follower 86 carried upon the upper extremity of an arm 88, the cam being fixed to a horizontal extending shaft 89, the latter being journalled in bearings 90 carried by frame 5. Fixed to the shaft 89 in juxtaposition with each collecting spool 53 is an upwardly extending arm 92 having an adjustable portion 93, the upper extremity of the adjustable portion carrying a grooved pulley 94 over which the coated wire is adapted to pass. The cam drum 80 is adapted to rotate comparatively slow through the medium of the worm wheel 81 and worm 82 so that the longitudinal movement of the cam follower 86 is correspondingly slow. Obviously the longitudinal movement of the cam follower 86 imparts a slow oscillatory movement to the arms 88 and arms 92 so that as the wire is accumulated upon the collector spool 53 the guiding pulley 94 over which the wire passes is adapted to move laterally to distribute the wire uniformly over the spool.

Figure 8:
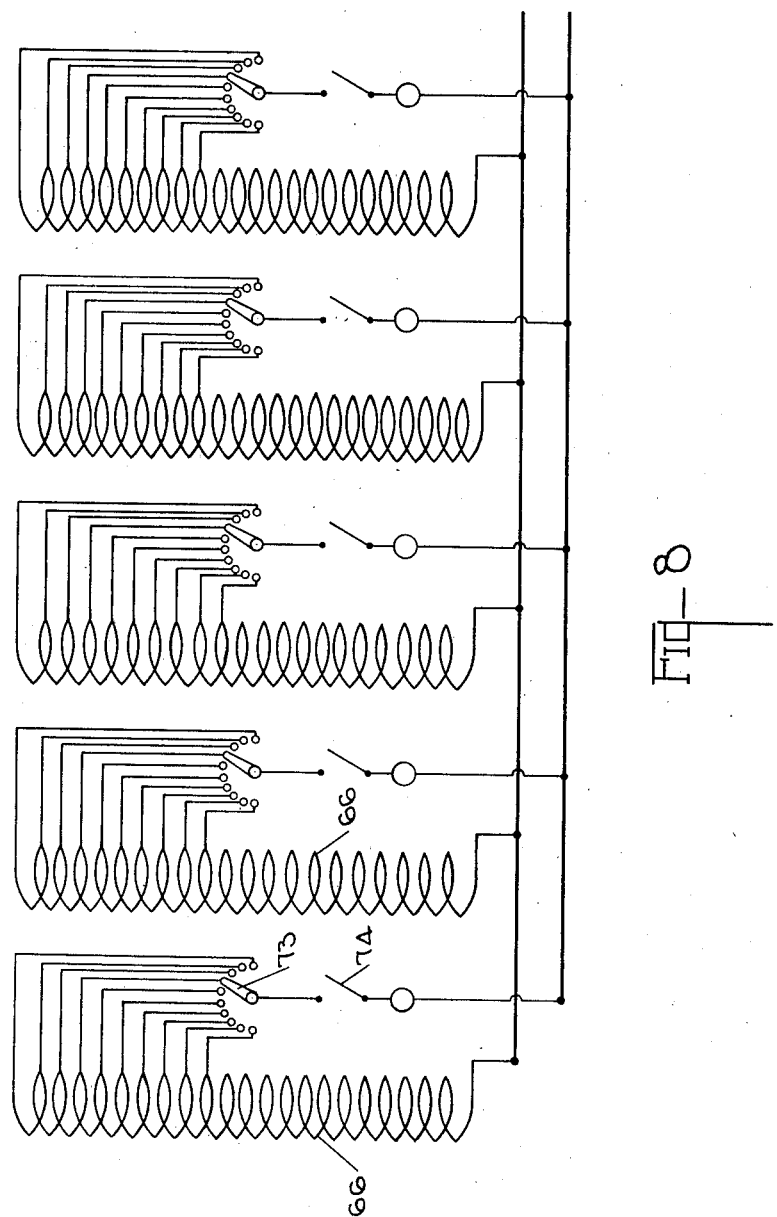
Figure 8 is a diagrammatic view of the electrical circuits employed in the machine.

In Figure 8, I have illustrated the electrical circuits for a battery of the heating ovens and it will be apparent that each oven may be independently controlled by means of the selector switches 73. Individual cut out switches 74 are provided for each heating element or oven so that in event of the breaking of wire passing through one of the ovens, the heating element may be rendered inactive without interfering with the operation of the remainder of the ovens. Obviously therefore it is unnecessary to stop the entire machine should one of the ovens break down.

In the operation of the device the wire is taken from the supply spool 27, is passed over guiding pulley 33 around pulley 23, immersed in the enamel bath, the coated wire thence passing upwardly through the electrically heated oven or tube 18. As the wire passes up through this tube the enamel becomes heated and is baked or solidifies upon the wire, the coated wire thence passing over the pulley 24 and downwardly exteriorly of the tube 18 where it is again passed around the pulley 23 receiving a second coat of enamel, the coated wire again passing up through the oven. This operation of coating and baking may be continued as many times as it is desired to coat the wire. After the last coat has been applied and baked on, the finished wire is passed again over the pulley 24 thence around the drawing or feeding pulley 48 over the guide pulley 94 the wire being then collected upon a collector spool 53. The wire feeding pulley 48 is driven at a constant or uniform speed irrespective of the varying diameters of wire on the wire supply and collecting spools 27 and 53.

It is apparent that, within the scope of the invention modifications and different arrangements may be made other than is herein disclosed, and the present disclosure is illustrative merely, the invention comprehending all variations thereof.

What I claim is:

1. In a wire enameling oven, the combination of an open ended hollow support of electrically insulating material capable of absorbing, transmitting and radiating heat at relatively high temperatures and arranged to permit the continuous passage therethrough of a strand of material to be treated, and a heating element around the outside of said tube, said element comprising a plurality of heating units arranged in series, and means for selectively varying the heated length of said element for varying the effective heated length of said tube.

2. In a wire enameling oven, the combination of an open ended tubular member of non-conducting substance; an electric heating element surrounding said member; an enclosing casing; a substantially non-combustible material interposed between said tubular member and said enclosing casing, said heating element comprising a plurality of heating units connected in series, said element having a plurality of taps between said units; and means for selectively connecting said taps to a source of electrical energy for varying the heat from said element and changing the effective heated length of said tubular member.

3. In a wire enameling oven adapted for the continuous passage therethrough of a strand of material to be treated, the combination of an open ended tubular member of non-conducting substance permitting a natural draft of heated gases in the direction of the travel of said material; an electric heating element surrounding said member; an enclosing casing; a substantially non-combustible material interposed between said tubular member and said enclosing casing, said heating element comprising a plurality of coils in series having taps; and means for selectively connecting said taps to a source of electrical energy for connecting said coils in series and for varying the effective heated length of said tubular member and changing the temperature of said tubular member.

4. In an electric oven, a metallic cylindrical casing; a tube of non-conducting substance positioned within said casing; a heating coil comprising a plurality of turns of wire surrounding said tube; a strip of heat resisting material separating said turns, said heating coil having a plurality of taps; a plurality of insulators carried by said casing and adapted to insulatingly support said taps; a selector switch; and means for connecting the points of said selector switch with said taps to vary the effective heated length of said tube.

5. In a wire enameling oven, an elongated support extending longitudinally of the oven and of electrically insulating material capable of radiating and transmitting therein and withstanding heat at relatively high temperatures; an electrically energized heating element surrounding said support, said heating element having a plurality of serially connected portions and means to vary the effective length of the heated portions of the element and the heated length of the support.

JOHN P. GERBER.